May 22, 1945.　　M. TURCHAN ET AL　　2,376,405
HYDRAULIC DUPLICATING SHAPER ATTACHMENT
Filed March 29, 1943　　5 Sheets-Sheet 3
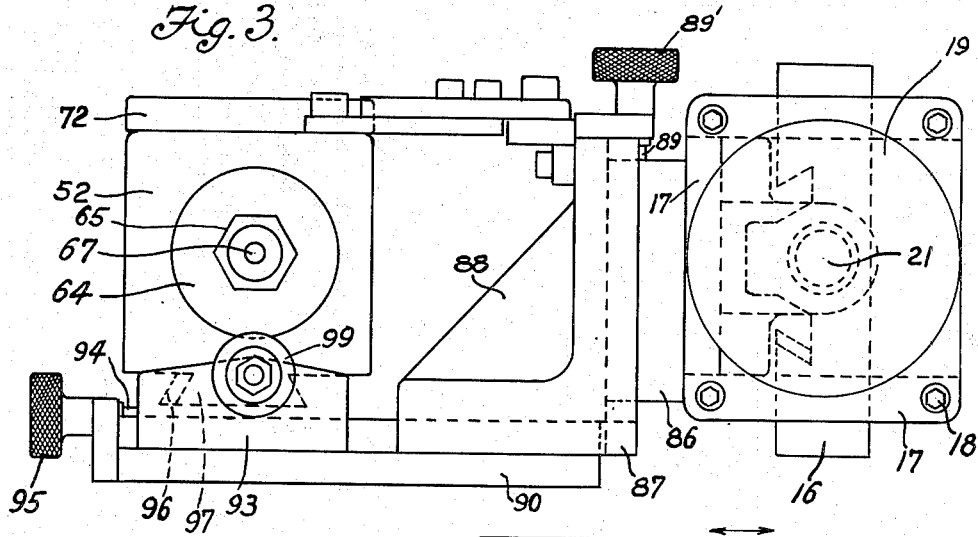
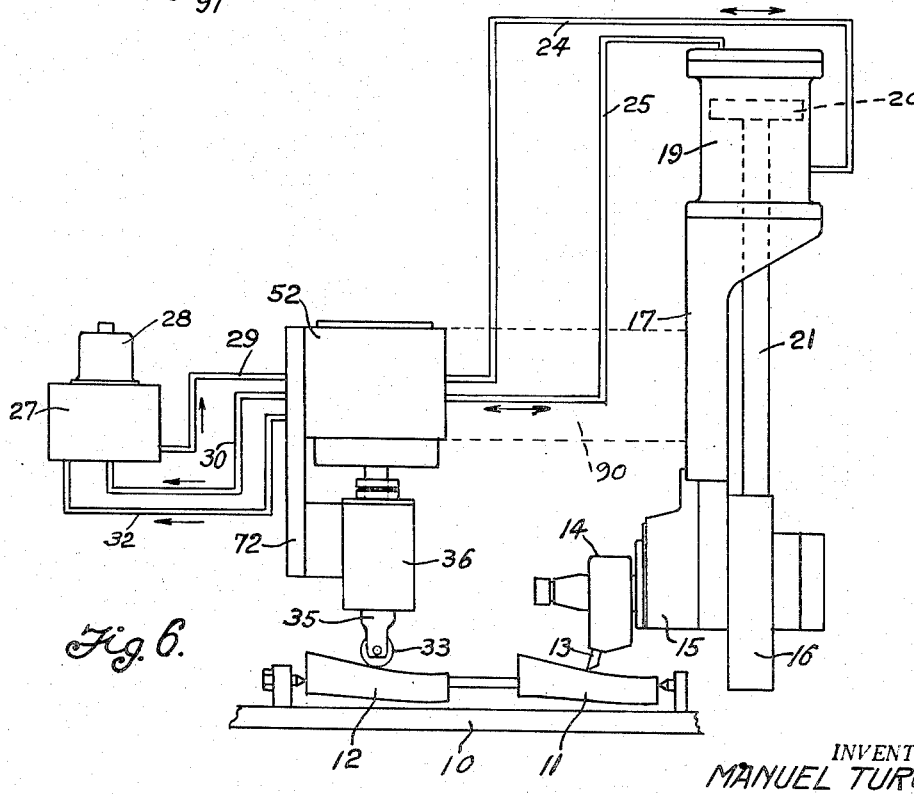
INVENTORS.
MANUEL TURCHAN
BY CURTIS WALKER.
Robert A. Sloman May 22, 1945.  M. TURCHAN ET AL  2,376,405
HYDRAULIC DUPLICATING SHAPER ATTACHMENT
Filed March 29, 1943  5 Sheets-Sheet 4

INVENTORS.
MANUEL TURCHAN.
BY CURTIS WALKER.

Robert A. Sloman

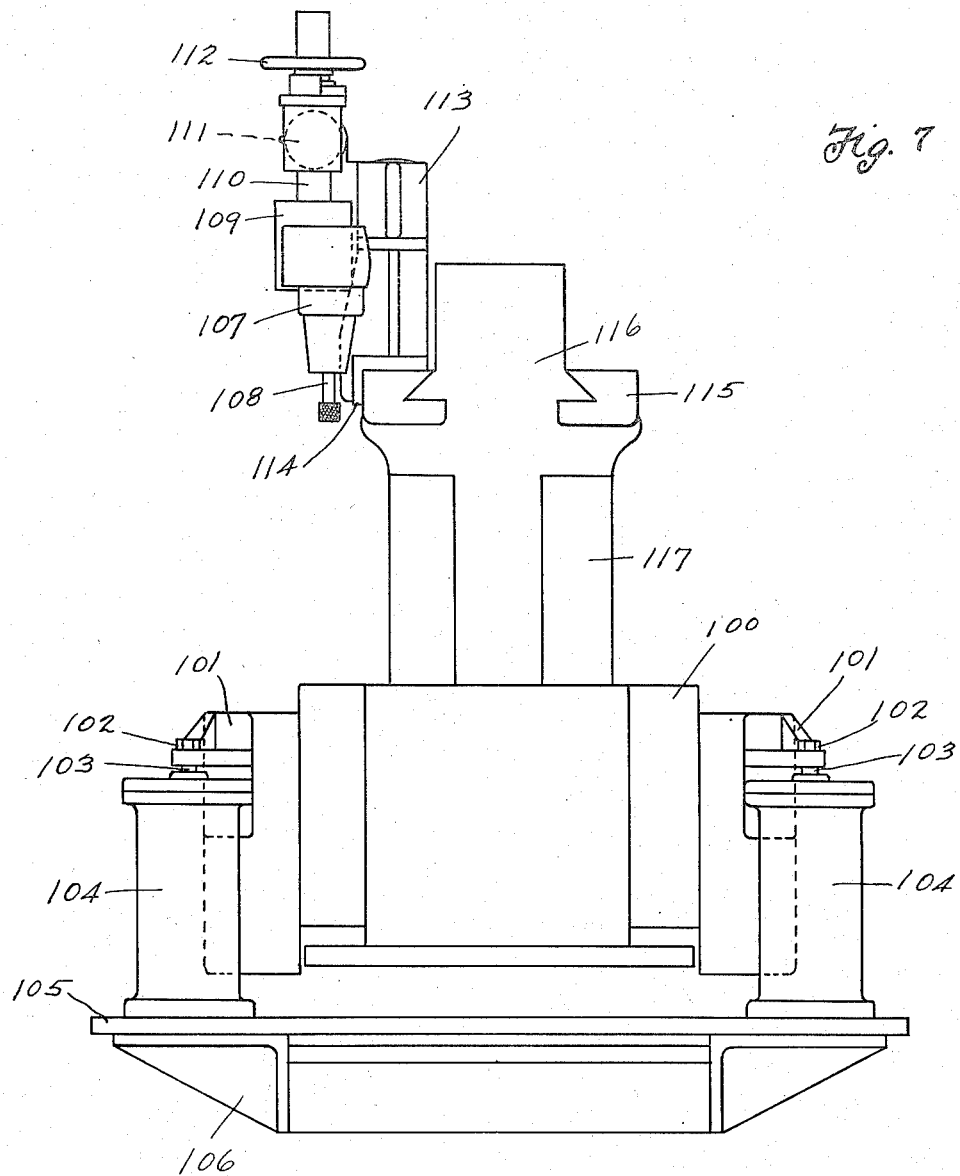

Patented May 22, 1945

2,376,405

UNITED STATES PATENT OFFICE 2,376,405

HYDRAULIC DUPLICATING SHAPER ATTACHMENT

Manuel Turchan, Dearborn, and Curtis Walker, Detroit, Mich.

Application March 29, 1943, Serial No. 481,056

21 Claims. (Cl. 90—24.3)

This invention relates to a shaper and a hydraulic duplicating attachment therefore wherein the cutter is adapted ordinarily to horizontally reciprocable movement actuated by a suitable reciprocable ram member forming a part of the shaper. Normally the work piece engaged by the cutter is supported upon a work table which is stationary throughout the reciprocable cutting and shaping operation, but which is adapted to transverse horizontal indexing or feeding permitting short increments of feed for each reciprocation of the cutter.

It is contemplated however for instance that said work table may be stationary with merely a rotatable support for a work piece, as a cam or cylinder having cam surfaces, together with suitable indexing means whereby upon each reciprocation of the cutter a slight rotary movement is given to the work piece until the cutter has longitudinally and reciprocably traversed its entire cylindrical surface.

It is contemplated that throughout such horizontal reciprocation of the cuter that it will also be necessary to obtain vertical feed movement thereof throughout and during its longitudinal reciprocable movements whereby an irregular surface may be cut.

It is the object of the present invention to provide an automatic means for governing this vertical reciprocable movement throughout and during the longitudinal reciprocable movement of the cutter to exactly reproduce an irregularly shaped work piece or cam member from a pattern or model.

It is contemplated that the pattern sought to be reproduced is likewise supported upon the work table so that the transverse feed imparted to the work piece is also imparted to the pattern. Or on the other hand, said table is provided with means whereby a cylindrical pattern is indexed or rotated an increment of its peripheral surface corresponding to the rotary indexing of the work piece.

A tracer mechanism is employed for operative engagement with the surface of the pattern for controlling through a suitable valve the flow of fluid under pressure to one end or the other of the vertical feed controlling cylinder attached to the shaper cutter carrying head.

The invention further relates to novel hydraulic connections and means for controlling fluid from a pressure source to a tracer controlled valve and thence to one end or the other of said cylinder. And further the invention relates to means for returning exhaust fluid from one end or the other of said cylinder back to the tracer controlled valve, and thence back to a suitable fluid storage sump.

The invention further relates to apparatus in combination for producing various cam members or cylindrical members having a plurality of irregular curvilinear surfaces for use in armament such as in guns, cannons, etc., wherein the configuration is irregular requiring constant changes in the vertical feed of the cutting tool as the same is reciprocated horizontally.

By providing a suitable tracer for engagement with a pattern, together with the necessary hydraulic connections, it is possible to obtain highly accurate reproduction thereof in the work piece.

It is the further object or purpose of this invention to provide a safety shear mechanism in conjunction with the tracer support upon the duplicating attachment to prevent damage to the tracer, or to the work whereby upon engagement with a sudden obstruction, the tracer may be pivotally rotated away from said obstruction causing at the same time, the cutter to be withdrawn from the work piece. Further in the case of a power failure in the hydraulic unit, whereby the vertical feed cylinder is not responsive to tracer control such a safety device prevents damage to the spindle, the pattern, or the work piece.

The invention therefore relates to the various elements hereinafter described and their various combinations as illustrated in the accompanying drawings of which—

Fig. 3 is a top plan view thereof.

Fig. 6 is a diagrammatic view of the hydraulic duplicating shaper attachment showing the hydraulic connections therefor. Fig. 7 is an elevational view of a different form.

It will be understood that the above drawings illustrate merely the preferable embodiment of the invention and that other embodiments are contemplated, within the scope thereof.

Figure 1:
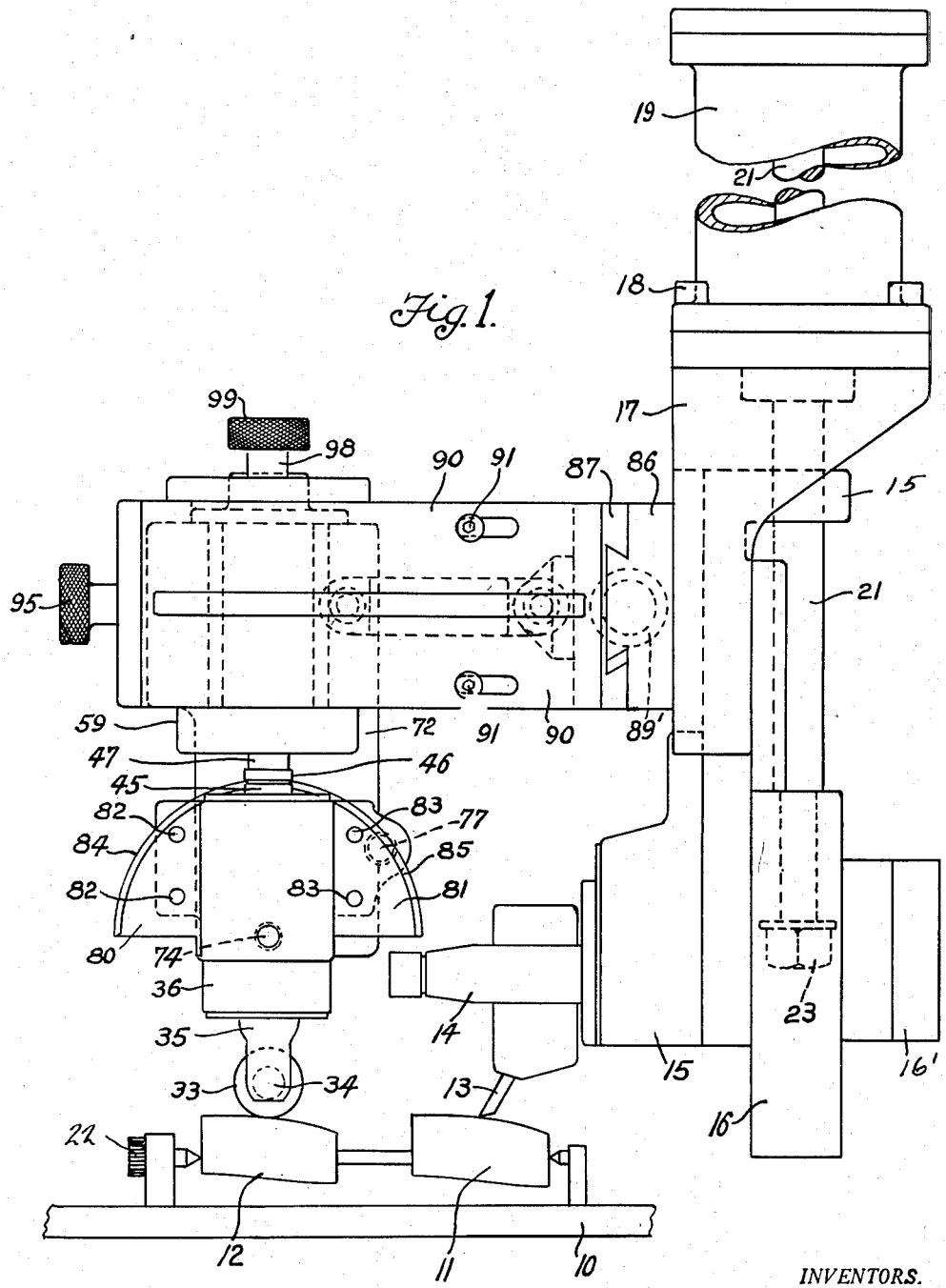
Fig. 1 is a side elevational view of the shaper head with duplicating attachment.

Referring to the drawings Fig. 1, a work piece is shown at 11 with a rotatable pattern 12 supported in any suitable manner upon work table 10. In the present embodiment means may be employed, such as gear 22, for indexing both the work piece and the pattern i. e. to rotate the same slowly and intermittently so that a longitudinally reciprocable cutter and tracer will, upon such indexing, eventually through longitudinal lines of movement cover the entire surface of the work piece and the pattern.

The shaper cutter 13 adjustably retained by the tool holder 14 is fed vertically with respect to the work piece 11 by means of the shaper head 15 at the same time and while said head is reciprocated longitudinally by a suitable ram not shown, but secured to member 16' forming a part of the non-vertically adjustable shaper head member 16.

Head 15 is reciprocable vertically being slidably engaged by a dovetail connection to the non-vertically adjustable shaper member 16 to which a suitable base is secured, though not shown herein.

Shaper head 15 extends upwardly, and is carried by the cylinder support 17 to which is secured at 18 the reciprocable cylinder 19. A stationary piston 20 is provisioned within cylinder 19 with respect to which said cylinder is reciprocably movable, said piston being maintained therein by the piston rod 21.

Piston rod 21 extends down through the bottom of cylinder 19 and is secured by bolt 23 to the stationary member 16 of the shaper. Thus with the flow of fluid under pressure to one side or the other of the piston within cylinder 19 in the manner hereafter described, said cylinder 19 will be caused to reciprocate vertically, causing controlled vertical feeding movement of the cutter 13 carried by the shaper head 15 at the same time that said cutter is reciprocated longitudinally.

The hydraulic duplicating attachment for the shaper head 15 is adapted for reciprocable vertical movement together with said head whereby said movement will be automatic governing the cutter tool 13 in obtaining a reproduction in the work piece corresponding to the shape and contour of the pattern 12.

Fig. 6 shows the fluid conduits 24 and 25 from the valve housing 52 to opposite ends of cylinder 19. Fluid under pressure is supplied by the hydraulic unit and fluid storage sump 27 having motor 28, through the pressure conduit 29 to said valve housing 52 whereby action of a suitable tracer controlled valve therein said fluid is directed out through conduit 24 or 25 to cylinder 19.

With fluid directed through conduit 24 to one side of piston 20, fluid on the other side is forced back on line 25 to housing 52 and thence through conduit 30 back through the hydraulic sump 27, Similarly with fluid directed through conduit 25, exhaust returns through conduit 24 back to the housing 52 and thence to the sump 27 through openings 56, 49 and 58 and conduit 30. It will be noted that exhaust openings 57 and 58 are interconnected by conduit 31 in sleeve 51.

An additional conduit 32 is also shown interconnecting a vacuum source within hydraulic unit 27 and the lower portion of valve housing 52 for scavenging or returning to said sump any excess oil for instance, which may seep to the bottom of said housing.

Figures 4, 5:
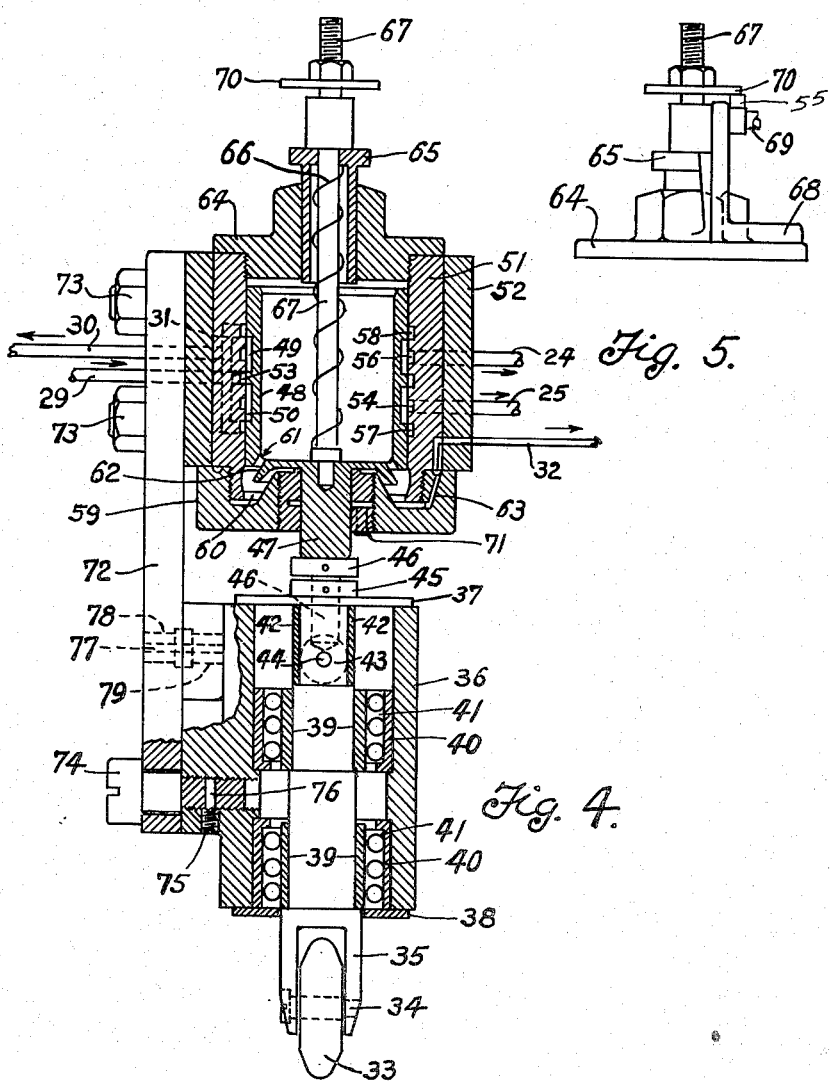
Fig. 4 is an elevational section of the tracer construction.
Fig. 5 is a fragmentary elevational view of the tracer hand control.

Referring to Figs. 1 and 4 the tracer forming a part of the duplicating attachment consists of a pattern engaging roller 33 journaled at 34 at the bottom of the longitudinally reciprocable spindle 35.

The spindle housing 36 with top and bottom plates 37 and 38 has slidably disposed therein spindle 35 which has secured thereon the inner bearing races 39. Corresponding outer bearing races 40 are suitably secured respectively within housing 36 with the ball bearing retainers 41 interposed therebetween, whereby a friction minimizing support is given to the vertically adjustable spindle 35.

Two pairs of oppositely disposed wear plates 42 are provisioned within spindle housing 36 providing guiding surfaces for the two oppositely arranged rollers 43 carried by the roller pin 44 which is disposed through the top end of spindle 35.

An adjusting screw 46 having a lock nut 45 thereon is threadably and adjustably disposed within the top of spindle 35 for cooperative engagement with the depending stem 47 forming a part of the fluid controlling valve member or piston 48. Piston 48 annularly recessed at 49 and 50 is adapted for vertical spindle imposed movement within the sleeve member 51 disposed in valve housing 52.

Fluid pressure conduit 29 from the hydraulic unit 27 shown in Fig. 6 communicates through a suitable passage in housing 52 and sleeve 51 with annular recess 53 therein for communication with either piston recess 49 or 50 depending upon the longitudinal position of piston 48.

With piston 48 elevated slightly above the position shown in Fig. 4 fluid under pressure from conduit 29 goes through recess 53 and into piston recess 50. Fluid is then conducted through sleeve recess 54 and out through cylinder conduit 25 to the upper end of cylinder 19, which causes upward movement thereof with respect to the stationary piston 20 shown in Fig. 6. This in turn causes an upward feed movement of cutter 13 with respect to work piece 11.

On the other hand piston 48 will be slightly below the central position shown in Fig. 4 by action of spring 66, as where the tracer roller 34 reaches a declivity or low spot in the pattern. Fluid from conduit 29 and recess 53 then goes into piston recess 49 and out through the sleeve recess 56 communicating with the cylinder conduit 24. Fluid under pressure is then directed to the lower end of cylinder 19 causing downward movement of said cylinder relative to stationary piston 20 and causing downward movement of the cutter 13.

At the same time fluid on the other side of piston 20 is forced back out through conduit 25 back to the tracer entering piston recess 54, and going into sleeve exhaust recess 57 and thence through channel 31 and conduit 30 back to hydraulic unit 27.

On the other hand when fluid is directed to cylinder 19 through conduit 25, fluid is forced back to the tracer through conduit 24, recess 56 and into piston recess 49, and then through exhaust recess 58, channel 31, and then through conduit 30 connected thereto back to the hydraulic unit.

Referring to Fig. 4 the valve housing is further completed by the bottom cap 59 which is interiorly threaded for engagement with the lower extending portion of the sleeve member 51 housing piston 48.

Cap 59 is recessed at 60 to receive any oil seepage from between piston 48 and sleeve 51 and also any oil which may seep down through openings 61 in said piston. Piston 48 is formed further with a downwardly depending annular flange 62 extending into recess 60 forming a guide for fluid seepage from within said piston directing the same into recess 60.

Outlet conduit 63 is provided within members 50, 51 and 52 for communication with the vacuum conduit 32 whereby any such fluid seepage accumulated in recess 60 is conducted back to the hydraulic unit 27.

A top flanged cap 64 is further threaded into the top of sleeve 51 having centrally threaded therein the spring tension adjusting screw 65 for spring 66 interposed between screw 65 and the bottom of piston 48. Spring 66 thereby provides a resilient means constantly tending to force piston 48 downward against the action of spindle 35; so that when roller 33 reaches a declivity or low spot in the pattern 12, it tends to drop to follow that surface by the action of spring 66.

The piston rod 67 disposed down through adjusting nut is secured centrally to the bottom of piston 48 whereby when rod 67 is manually lifted, control of valve 48 is obtained independently of spindle 35. A suitable bracket 68, shown in Fig. 5, is secured to the top of cap 64 for journaling the shaft 69 on which is provided a cam member 55, for manually elevating the disc 70 secured on piston rod 67.

A suitable handle, not shown, may be secured upon the end of shaft 69 with said cam member forming a part thereof for manually elevating disc 70 when desired to actuate valve 48 independently of spindle 35.

A hollow lock nut 71 is threadably disposed within the bottom cap 59 through which is slidably disposed the stem member 47 forming a part of piston 48.

A connector plate 72 secured to valve housing 52 by bolts 73 depends downwardly providing a pivotal support, by means of bolt 74, for the spindle housing 36. Bolt 74 disposed through plate 72 threadably engages spindle housing 36, there being a locking stud 75 disposed through housing 36 for engagement with an annular recess 76 in bolt 74 preventing loosening thereof.

The connection between bolt 74 and plate 72 being loose, it is seen that spindle housing 36 is free to pivot with respect thereto in the event that roller 33 should engage a sudden obstruction, or where there is a failure in the power source so that the cutter and tracer are not properly elevated.

In normal operation however a shearing pin 77 of relatively soft metal is also interposed between housing 36 and plate 72, being nested within the two opposing plugs 78 and 79 respectively disposed within connector plate 72 and spindle housing 36.

In operation upon engagement by roller 33 of a sudden obstruction in the pattern not contemplated by the operator of the shaper device, or in the event that the control cylinder 19 is not responsive, as in the case of a power failure, the shear pin 77 is broken permitting pivotal movement of spindle housing 36 around bolt 74 thereby preventing damage to the spindle, to the pattern or to the work piece.

Figure 2:
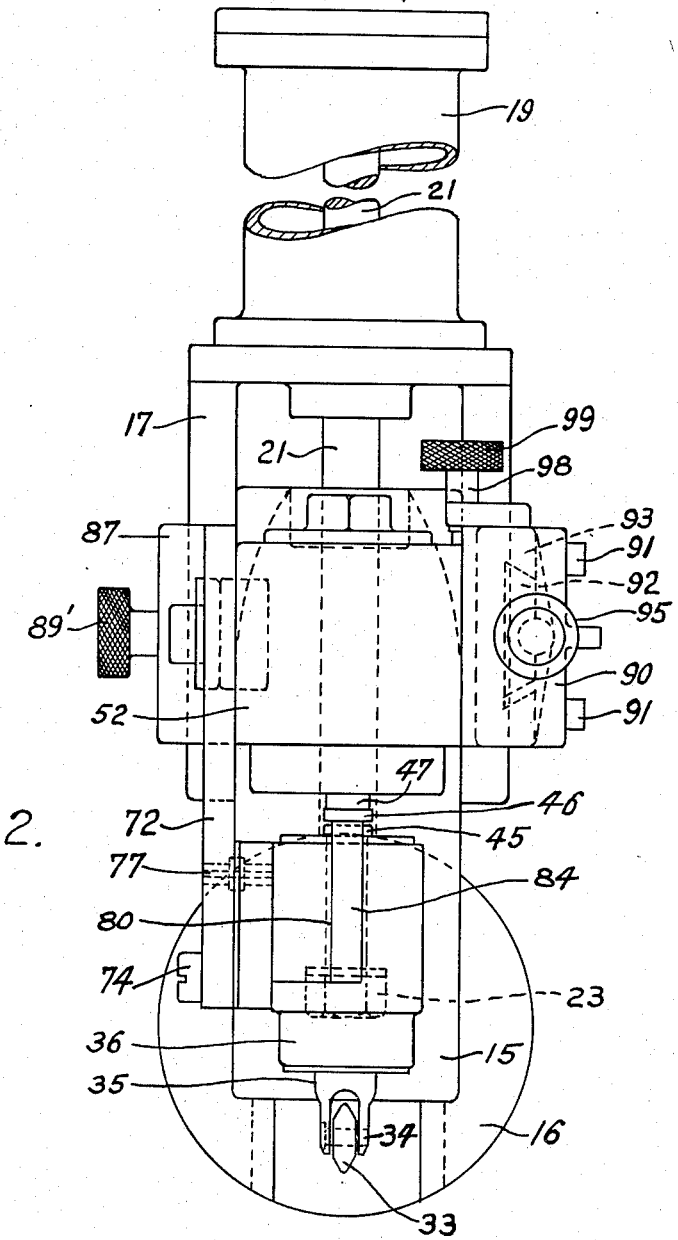
Fig. 2 is a left end elevational view thereof.

Referring to Fig. 1 a pair of oppositely disposed transversely extending safety arms 80 and 81 are secured at points 82 and 83 respectively to the spindle housing 36. Cam surfaces 84 and 85 form the outer edges of arms 80 and 81 respectively as shown in Fig. 2, and being secured to spindle housing 36 are adapted to tilt or rotate therewith in the event that the shear pin 78 is broken in the manner above described.

Cam surfaces 84 or 85 depending upon the direction of rotation of spindle housing 36 are adapted to engage the under surface of the projecting stem 47 forming a part of piston 48. Consequently upon roller 33 engaging an obstruction causing shearing of pin 77, spindle housing 36 pivots on bolt 74, at the same time causing either cam surface 84 or 85 to engage stem 47 of piston 48. This in turn causes upward movement of piston 48 permitting fluid under pressure from conduit 29 to enter recesses 50 and 54 for direction out conduit 25 to the upper end of cylinder 19, which in turn causes upward movement of said cylinder.

This in turn causes upward feed movement of the cutter 13 and also upward movement of the entire tracer until the obstruction is overcome.

The entire tracer assembly including valve housing 52 and spindle housing 36 is adapted to move with cylinder 19 by virtue of the adjustable connection between valve housing 52 and the cylinder support 17 now described.

Referring to Figs. 1, 2 and 3, cylinder support 17 has secured thereto the dovetail block 86, cooperatively and slidingly engaged by the corresponding dovetail connection 87 forming a part of the angular member 88.

A threaded shaft 89 with handle 89' is loosely journalled through angle member 88 at the same time threadably engaging the dovetail block 86, whereupon manual rotation of shaft 89 angle member 88 may be adjusted horizontally with respect to the cylinder support 17 secured to the shaper head 15.

A front connector plate or arm 90 secured to arm 88 by bolts 91 has secured thereto on its inner surface the dovetail block 92, shown in Fig. 2, or forming a part thereof. A corresponding horizontally sliding dovetail member 93 cooperatively engaging dovetail member 92, is adapted to relatively sliding movement thereon by virtue of the threaded shaft 94 having on its end a knurled handle 95.

Shaft 94 is rotatably journalled within and through block 92 and arm 90 threadably engaging dovetail block 93 whereby upon actuation of handle 95 block 93 may be adjusted horizontally and transversely to the hand adjusting means 89.

Block 93 also has a dovetail recess 96 within which is slidably disposed the corresponding vertically adjustable dovetail valve housing supporting member 97. Referring to Figs. 1, 2 and 3 a threaded shaft 98 with knurled handle 99 is rotatably journalled within and upon the horizontally adjustable block 93, threadably engaging valve housing support 97, whereupon actuating handle 99 vertical adjustment of block support 97 on the valve housing 52 may be obtained.

Consequently by handles 89', 95 and 99 accurate adjustment of valve housing 52 vertically and horizontally in two directions may be obtained with respect to shaper head 15.

It is contemplated as part of the present invention that the tracer may be employed similarly for governing vertical reciprocable feed movements of the work piece and templet supporting table rather than vertical adjustment of the shaper tool throughout its horizontal reciprocation.

For instance under certain conditions a templet may be employed where its shape may be reproduced a number of times in a work piece by the shaper mechanism. For example if it were desired to shape a crankshaft which has a plurality of similarly shaped surfaces, a single templet could be disposed upon the work table adapted merely for vertical adjustment therewith. The tracer for engaging such templet can be set once and then remain relatively stationary, with only the cutter being horizontally reciprocable in the conventional manner for shaping each of the flanged members of said crank shaft.

Referring to Fig. 7 the vertically adjustable templet and work piece supporting table 100 has secured thereto at opposite ends the anchor brackets 101 which are in turn secured by nuts 102 to the vertically movable piston rods 103.

Suitable pistons not shown are secured on the ends of rods 103 within cylinders 104, the latter being firmly positioned upon the base plate 105 and cylinder support 106.

Tracer 107 with its templet engaging spindle 108 is supported by the adjusting assembly 109 carried upon the end of shaft 110. The upper end of shaft 110 carried by over-arm 111, is adjustably disposed with respect thereto being threadably engaged by the hand adjusting wheel 112.

Horizontal over-arm 111 extends adjustably through the upwardly projecting arm bracket 113 in turn carried by the tracer bracket 114 supported upon the horizontally adjustable dovetail slide 115. The corresponding dovetail member 116 terminates in the base support 117 which is independent of and disposed behind the adjustable work table 100 as shown in Fig. 7.

Consequently a suitable templet may be carried upon table 100 adapted however for rotary indexing corresponding to a similarly supported work piece; whereby as the cutter is reciprocated horizontally towards and away from the tracer supporting base 117, vertical feeding of the work piece and templet will be governed by cylinders 104.

In a manner similar to that shown in Fig. 6 fluid under pressure from a hydraulic unit is conducted to tracer 107 whereby action of the spindle actuated valve therein fluid is conducted to one end or the other of the two cylinders 104 governing feed movement of the templet and work piece supporting table 100.

Spindle 108 is adapted for contact with the surface of the templet supported upon table 100, said templet though not shown on the drawings being adapted for indexing rotary movement so that its periphery will be brought into engagement with said spindle.

The advantage of this arrangement permits the tracer to remain substantially stationary thereby obtaining greater accuracy of reproduction under some conditions.

Having described our invention, reference should be had to the claims which follow for determining its scope.

We claim:

1. A hydraulic duplicating attachment for a vertically adjustable longitudinally reciprocable cutter carrying shaper head comprised of vertically reciprocable means carrying said shaper head, a valve housing secured to and movable with said head, a tracer housing carried by said valve housing and pivotally mounted with respect thereto, a vertically adjustable spindle slidably provisioned within said tracer housing, with a pattern engaging roller on the end thereof, a shear pin interposed between said tracer housing and said valve housing, and spindle actuated fluid controlling means in said valve housing for controlling the flow of fluid under pressure to either end of said vertically reciprocable means, whereby continuous vertical adjustment of the shaper head may be obtained throughout its longitudinal reciprocation.

2. A hydraulic duplicating attachment for a vertically adjustable longitudinally reciprocable cutter carrying shaper head, whereunder the surface of a work piece and pattern are supported for indexed feed relation, comprised of a vertically adjustable shaper head carrying cylinder, a valve housing secured to said head, a tracer housing carried by said valve housing and pivotally mounted thereunder, a vertically adjustable pattern engaging spindle within said tracer housing, a shear pin between the latter and said valve housing, and a spindle actuated valve in said valve housing for controlling fluid to either end of said cylinder.

3. A hydraulic duplicating attachment for a vertically adjustable longitudinally reciprocable cutter carrying shaper head, whereunder the surface of a work piece and pattern are supported for indexed feed relation, comprised of a vertically adjustable shaper head carrying cylinder, a valve housing secured to said head, a tracer housing carried by said valve housing and pivotally mounted thereunder, a vertically adjustable pattern engaging spindle within said tracer housing, a shear pin between the latter and said valve housing, a spindle actuated piston in said valve housing and extending therebelow for cooperative engagement with said spindle for controlling fluid to either end of said cylinder.

4. A hydraulic duplicating attachment for a vertically adjustable longitudinally reciprocable cutter carrying shaper head, whereunder the surface of a work piece and pattern are supported for indexed feed relation, comprised of a vertically adjustable shaper head carrying cylinder, spindle actuated fluid control means joined to said head, a tracer housing carried by said control means and pivotally mounted thereunder, an adjustable pattern engaging spindle provisioned in said tracer housing and engaging said fluid control means, and a shear pin interposed therebetween.

5. A hydraulic duplicating attachment for a vertically adjustable longitudinally reciprocable cutter carrying shaper head having a non-vertically adjustable member comprised of a vertically adjustable shaper head carrying cylinder, a stationary piston therein secured to said non-vertically adjustable member, a valve housing secured to said head, a tracer housing carried by said valve housing and pivotally mounted thereunder, a vertically adjustable pattern engaging spindle within said tracer housing, a shear pin between the latter and said valve housing, and a spindle actuated valve in said valve housing for controlling fluid to either end of said cylinder.

6. A hydraulic duplicating attachment for a vertically adjustable longitudinally reciprocable cutter carrying shaper head, whereunder the surface of a work piece and pattern are supported for indexed feed relation, comprised of a vertically reciprocable head carrying cylinder, means for causing intermittent longitudinal reciprocation of said head throughout and during its vertical adjustment, a pattern engaging tracer, tracer actuated fluid control means joined to said head for controlling fluid from a pressure source to either end of said cylinder, means pivotally mounting said tracer to said control means, and a shear pin interposed therebetween.

7. A hydraulic duplicating attachment for a vertically adjustable longitudinally reciprocable cutter carrying shaper head, whereunder the surface of a work piece and pattern are supported for indexed feed relation, comprised of a vertically reciprocable head carrying cylinder, means for causing intermittent longitudinal reciprocation of said head throughout and during its vertical adjustments, a pattern engaging tracer, tracer actuated fluid control means joined to said head for controlling flow of fluid from a pressure source to said cylinder, means pivotally mounting said tracer to said control means, a shear pin interposed therebetween, and a cam on said tracer for actuating said fluid control means when said tracer is rotated about its pivotal mounting on engaging an obstruction.

8. A hydraulic duplicating attachment for a vertically adjustable cylinder reciprocated cutter carrying shaper head, whereunder the surface of a work piece and pattern are supported for indexed feed relation, comprised of a pattern engaging tracer, a valve housing to which said tracer is pivotally mounted, and within which is a reciprocable valve piston for controlling the flow of fluid from a pressure source to both ends of said cylinder, adjustable means interconnecting said housing and said shaper head, a safety shearing pin between said tracer and housing, means interconnecting said tracer with said piston, and a cam on said tracer for actuating said means when said tracer is tilted about its pivotal axis upon engaging an obstruction.

9. A hydraulic duplicating attachment for a vertically adjustable cylinder reciprocated cutter carrying shaper head, whereunder the surface of a work piece and pattern are supported for indexed feed relation, comprised of a tracer housing, a reciprocable pattern engaging spindle projecting therethrough, a valve housing to which said tracer is pivotally mounted, and within which is a reciprocable valve piston for controlling the flow of fluid from a pressure source to both ends of said cylinder, adjustable means interconnecting said housing and said shaper head, a safety shearing pin between said tracer and housing, means interconnecting said spindle with said piston, and a cam on said tracer housing for actuating said means when said spindle is tilted around its axis upon engaging an obstruction.

10. A hydraulic duplicating attachment for a vertically adjustable cylinder reciprocated cutter carrying shaper head, whereunder the surface of a work piece and pattern are supported for indexed feed relation, comprised of a tracer housing, a reciprocable spindle projecting therethrough with a pattern engaging roller on the end thereof, guide means between said spindle and tracer housing to prevent axial twisting of said spindle, a valve housing to which said tracer is pivotally mounted, and within which is a reciprocable spindle actuated valve piston for controlling the flow of fluid from a pressure source to both ends of said cylinder, adjustable means interconnecting said housing and said shaper head, a safety shearing pin between said tracer and housing, and a cam on said tracer housing for actuating said piston when said spindle is rotated around its axis upon engaging an obstruction.

11. A hydraulic duplicating attachment for a vertically adjustable cylinder reciprocated cutter carrying shaper head, whereunder the surface of a work piece and pattern are supported for indexed feed relation, comprised of a tracer housing, a reciprocable pattern engaging spindle projecting therethrough, a valve housing to which said tracer is pivotally mounted, and within which is a reciprocable spindle actuated valve piston for controlling the flow of fluid from a pressure source to both ends of said cylinder, adjustable means interconnecting said housing and said shaper head, a safety shearing pin between said tracer and housing, a cam on said tracer housing for actuating said piston when said spindle is tilted around its axis upon engaging an obstruction, and a manual control on said valve housing for actuating said piston independent of said spindle.

12. A hydraulic duplicating attachment for a vertically adjustable cylinder reciprocated cutter carrying shaper head, whereunder the surface of a work piece and pattern are supported for indexed feed relation, comprised of a tracer housing, a reciprocable pattern engaging spindle projecting therethrough, a valve housing to which said tracer is pivotally mounted, and within which is a reciprocable spindle actuated valve piston for controlling the flow of fluid from a pressure source to both ends of said cylinder, adjustable means interconnecting said housing and said shaper head, a safety shearing pin between said tracer and housing, and a pair of oppositely disposed cams on said tracer housing, either of which being adapted to actuate said piston when said spindle is tilted in either direction around its pivotal axis upon engaging an obstruction.

13. A hydraulic duplicating attachment for a vertically adjustable cylinder reciprocated cutter carrying shaper head, whereunder the surface of a work piece and pattern are supported for indexed feed relation, a pattern engaging tracer, a valve housing joined to said head, pivotal means interconnecting said tracer and housing, a safety shear pin interposed therebetween, a reciprocable piston within said valve housing actuated by said tracer for controlling fluid under pressure to said cylinder, and a cam mechanism on said tracer adapted to actuate said piston upon pivotal movement of said tracer.

14. The combination with a vertically adjustable longitudinally reciprocable cutter carrying shaper head whereunder the surface of a work piece and pattern are supported for indexed feed relation, and a reciprocable head carrying cylinder with a stationary piston therein; of a hydraulic unit for supplying fluid under pressure; and a pattern duplicating attachment for said head consisting of a valve housing adjustably secured thereto, conduits joined to said valve housing connecting both ends of said cylinder, and also interconnecting said hydraulic unit, a reciprocable valve in said housing for controlling communication between said conduits, a pattern engaging tracer pivotally joined to said housing for pivotal deflection upon engaging an obstruction, a shearing pin between said tracer and housing, and interconnecting means between said tracer and valve for regulating the latter.

15. The combination with a vertically adjustable longitudinally reciprocable cutter carrying shaper head whereunder the surface of a work piece and pattern are supported for indexed feed relation, and a reciprocable head carrying cylinder with a stationary piston therein; of a hydraulic unit for supplying fluid under pressure; and a pattern duplicating attachment for said head consisting of a valve housing adjustably secured to said head, conduits joined thereto connecting both ends of said cylinder, and also interconnecting said hydraulic unit, a reciprocable valve in said housing for controlling communication between said conduits, a pattern engaging tracer pivotally joined to said housing for pivotal deflection upon engaging an obstruction, a shearing pin between said tracer and housing, interconnecting means between said tracer and valve for regulating the latter, and a cam upon said tracer for actuating said valve when the tracer is deflected.

16. The combination with a vertically adjustable longitudinally reciprocable cutter carrying shaper head whereunder the surface of a work piece and pattern are supported for indexed feed relation, and a reciprocable head carrying cylinder with a stationary piston therein; of a hydraulic unit for supplying fluid under pressure, and also a vacuum; and a pattern duplicating attachment for said head consisting of a valve housing adjustably secured to said head, conduits joined thereto connecting both ends of said cylinder, and also interconnecting said fluid pressure source, and said vacuum source for scavenging fluid leakage in said housing, a reciprocable valve in said housing for controlling communication between said conduits, a pattern engaging tracer pivotally joined to said housing for pivotal deflection upon engaging an obstruction, a shearing pin between said tracer and housing, and interconnecting means between said tracer and valve for regulating the latter.

17. A hydraulic duplicating attachment for a vertically adjustable cylinder reciprocated cutter carrying shaper head, whereunder the surface of a work piece and pattern are supported for indexed feed relation, comprised of a vertically adjustable shaper head carrying cylinder, an arm adjustably secured to said shaper head, a valve housing adjustably carried by said arm, a connector plate secured to and depending downwardly from said housing, a tracer housing pivotally mounted upon said connector plate, a pattern engaging spindle provisioned within said housing, a shear pin interposed between the latter and said connector plate, and a spindle actuated valve in said valve housing for controlling fluid to either end of said cylinder.

18. A hydraulic duplicating attachment for a vertically adjustable longitudinally reciprocable cutter carrying shaper head, whereunder the surface of a work piece and pattern are supported for indexed feed relation, comprised of a vertically adjustable shaper head carrying cylinder, spindle actuated fluid control means joined to said head, a tracer housing carried by said control means and pivotally mounted thereunder, a shear pin interposed between said housing and said control means, and an adjustable pattern engaging spindle provisioned in said tracer housing and engaging said fluid control means.

19. A hydraulic duplicating attachment for a longitudinally reciprocable cutter carrying shaper head, whereunder the surfaces of a work piece and pattern are adjustably supported for indexed feed relation, comprised of means causing intermittent longitudinal reciprocation of said shaper head, a vertically adjustable templet and work piece supporting table, hydraulic cylinders joined to said table governing vertical feed movement thereof, a tracer actuated fluid control means for controlling fluid from a fluid pressure source to either end of said cylinders, a templet engaging tracer carried by said control means and pivotally supported thereunder in cooperating relation, and a shear pin interposed between said tracer and said control means.

20. A hydraulic duplicating attachment for a longitudinally reciprocable cutter carrying shaper head, whereunder the surfaces of a work piece and pattern are adjustably supported for indexed feed relation, comprised of means causing intermittent longitudinal reciprocation of said shaper head with respect to a work piece, a vertically adjustable templet and work piece supporting table relatively to which said cutter head is longitudinally and reciprocably fed, hydraulic means joined to said table at opposite ends thereof governing feed movements of said work piece with respect to said reciprocable shaper head, tracer actuated fluid control means for directing fluid from a fluid pressure source to either end of said hydraulic means for governing reciprocable feed movement of said templet and work piece supporting table, a templet engaging tracer carried by said control means and pivotally supported thereunder, and a shear pin interposed between said tracer and said control means.

21. The combination with a vertically adjustable longitudinally reciprocable cutter carrying shaper head whereunder the surface of a work piece and pattern are supported for indexed feed relation, and a reciprocable head carrying cylinder with a stationary piston therein; a valve housing joined to said head, a longitudinally reciprocable pattern engaging spindle pivotally joined to said housing, a reciprocable spindle actuated valve within said housing for controlling fluid under pressure to both ends of said cylinder, a shear pin between said spindle and said housing, and a cam on said spindle for actuating said valve when said spindle is rotated upon encountering an obstruction.

MANUEL TURCHAN.
CURTIS WALKER.